United States Statutory Invention Registration [19]

[11] Reg. Number: H750

Ogawa et al. [43] Published: Mar. 6, 1990

[54] HERBICIDAL SUSPENSION CONCENTRATE

[75] Inventors: Yasuo Ogawa; Fumio Kimura; Akira Kimura; Takeshi Hiratsuka; Nobuyuki Sakashita; Chimoto Honda, all of Kasatsu, Japan

[73] Assignee: Ishihara Sangyo Kaisha Ltd., Osaka, Japan

[21] Appl. No.: 260,649

[22] Filed: Oct. 21, 1988

[30] Foreign Application Priority Data

Oct. 22, 1987 [JP] Japan ..... 62-267548

[51] Int. Cl.[4] ..... A01N 43/54

[52] U.S. Cl. ..... 71/92; 71/DIG. 1

[56] References Cited

U.S. PATENT DOCUMENTS

| | | | |
|---|---|---|---|
| 3,997,322 | 12/1976 | Ratledge et al. | 71/93 |
| 4,529,438 | 7/1985 | Leel | 71/94 |

FOREIGN PATENT DOCUMENTS

| | | |
|---|---|---|
| 0232067 | 1/1987 | European Pat. Off. . |
| 0237292 | 3/1987 | European Pat. Off. . |
| 2701129 | 7/1978 | Fed. Rep. of Germany . |
| 59-134702 | 8/1984 | Japan . |
| 60-132904 | 7/1985 | Japan . |
| 803772 | 10/1958 | United Kingdom . |

OTHER PUBLICATIONS

Chemical & Engineering News, 7-21-69, p. 41.

*Primary Examiner*—John F. Terapane
*Assistant Examiner*—Daniel S. Metzmaier
*Attorney, Agent, or Firm*—Sughrue, Mion, Zinn, Macpeak & Seas

[57] ABSTRACT

A herbicidal suspension concentrate characterized by comprising from 0.5 to 20 parts by weight of at least one compound selected from among sulfonamide compounds represented by the general formula (I).

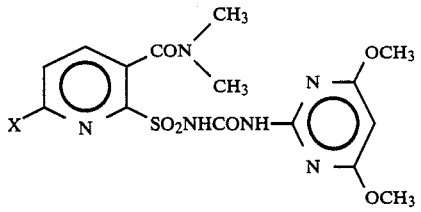

(I)

(wherein X is a hydrogen atom, a chloride atom, a bromine atom, a methyl group, or a difluoromethyl group) and their salts as an active ingredient, from 55 to 94.5 parts by weight of a vegetable oil, and from 5 to 25 parts by weight of a surfactant.

4 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HERBICIDAL SUSPENSION CONCENTRATE

BACKGROUND OF THE INVENTION

1. Field of the Invention

The present invention relates to a herbicidal suspension concentrate comprising a specific sulfonamide compound(s) and/or a salt(s) thereof, a vegetable oil, and a surfactant at a specified ratio. This is a useful concentrate which can control a wide variety of harmful weeds without any phytotoxicity against corns when applied to corn fields.

2. Description of the Related Art

European Patent Laid-Open Nos. 232,067 and 237,292 both disclose that sulfonamide compounds and their salts, which are the active ingredients contained in the herbicidal suspension concentrate of the present invention, are useful as herbicides for application to corn fields. However, they fail to disclose that these compounds can be admixed with a vegetable oil and a surfactant, thereby to prepare a suspension concentrate.

While, on the other hand, U.S. Pat. Nos. 3,997,322, No. 4,529,438, British Pat. No. 803,772, West German Pat. No. 2,701,129, Chemical and Engineering News, July 21, 1969, page 41, Japanese Patent Application No. 58-8232 (published on August 2, 1984 as publication No. KOKAI 59-134702) and Japanese Patent Application No. 58-242982 (published on July 16, 1985 as publication No. KOKAI 60-132904) all contain descriptions relating to the preparation of herbicidal compositions by mixing herbicidal compounds with vegetable oils, these prior art papers, however, fail to disclose that the specific sulfonamide compounds and their salts which are contained in the herbicidal suspension concentrate of the present invention can be used as herbicidal compounds.

SUMMARY OF THE INVENTION

The present invention relates to a herbicidal suspension concentrate characterized by comprising from 0.5 to 20 parts by weight of at least one compound selected from among sulfonamide compounds represented by the general formula (I):

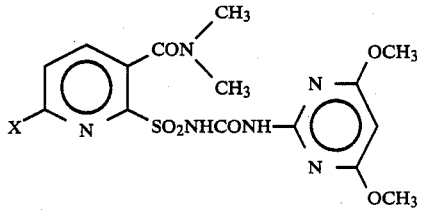

(I)

(wherein X is a hydrogen atom, a chlorine atom, a bromine atom, a methyl group, or a difluoromethyl group) and their salts as an active ingredient, from 55 to 94.5 parts by weight of a vegetable oil, and from 5 to 25 parts by weight of a surfactant.

The suspension concentrate of the present invention, when applied to a corn field, provides improved weeding effect against harmful weeds in general, and against gramineous weeds in particular, without any phytotoxicity against corns. As a result of this improvement, the spectra of the harmful weeds to be controlled are spread, and further the amount of the active ingredient compound to be used can be decreased.

DETAILED DESCRIPTION OF THE PREFERRED EMBODIMENTS

As was mentioned previously, the sulfonamide compounds of the present invention, represented by the general formula (I), and their salts are already known as herbicides for application to corn fields. In practical use of these compounds, however, it is still required to decrease the amount of the active ingredient compound to be used in view of the reduction of expenditure for weeding and the reduction of environmental contamination. While it is also required to control as perfectly as possible a variety of weeds differing in growth stage without any crop injury to corns.

The authors of the present invention have found that use of a vegetable oil in the preparation of a suspension concentrate wherein the sulfonamide compound, represented by the general formula (I), or its salt is blended with the vegetable oil and a specific surfactant at a specific weight ratio can satisfy the requirements mentioned above when an aqueous diluted suspension prepared from the suspension concentrate is applied to a corn field. Namely they have found that use of the vegetable oil improves the weeding effect against broad spectra of the harmful weeds to be controlled without any phytotoxicity against corns and can decrease the amount of the active ingredient compound to be used, and that consequently reduction of environmental pollution can be expected.

Examples of sulfonamide compounds which are represented by the general formula (I), and which therefore can be used in the present invention, include N-[(4,6-dimethoxypyrimidin-2-yl)aminocarbonyl]-3-dimethylaminocarbonyl-2-pyridinesulfonamide, N-[(4,6-dimethoxypyrimidin-2-yl)aminocarbonyl]-6-chloro-3-dimethylaminocarbonyl-2-pyridinesulfonamide, N-[(4,6-dimethoxypyrimidin-2-yl)aminocarbonyl]-6-bromo-3-dimethylaminocarbonyl-2-pyridinesulfonamide, N-[(4,6-dimethoxypyrimidin-2-yl)aminocarbonyl]-3-dimethylaminocarbonyl-6-methyl-2-pyridinesulfonamide, and N-[(4,6-dimethoxypyrimidin-2-yl)aminocarbonyl]-6-difluoromethyl-3-dimethylaminocarbonyl-2-pyridine-sulfonamide.

Further, salts of the above-mentioned sulfonamide compound include those of alkali metals such as sodium and potassium, those of alkali earth metals such as magnesium and calcium, and those of amines such as monomethylamine, dimethylamine and triethylamine, specific examples of which include sodium and monomethylamine salts of N-[(4,6-dimethoxypyrimidin-2-yl)aminocarbonyl]-3-dimethylaminocarbonyl-2-pyridinesulfonamide, and dimethylamine salt of N-[(4,6-dimethoxypyrimidin-2-yl)aminocarbonyl]-3-dimethylaminocarbonyl-6-methyl-2-pyridinesulfonamide.

Among the above-mentioned sulfonamide compounds, N-[(4,6-dimethoxypyrimidin-2-yl)aminocarbonyl]-3-dimethylaminocarbonyl-2-pyridinesulfonamide and its salts are exemplified as preferred compounds.

Examples of vegetable oils which can be used in the present invention include olive oil, kapok oil, castor oil, palm oil, camellia oil, coconut oil, sesame oil, corn oil, rice bran oil, peanut oil, cotton seed oil, soybean oil, rape seed oil, linseed oil, and tung oil. Among these vegetable oils, corn oil is particularly preferred.

In the present invention, any surfactant may be used as long as it can emulsify the above-mentioned vegetable oils in water.

. Examples of such surfactants include those of vegetable oil derivatives such as polyoxyethylene hydrogenated castor oil ether; nonionic surfactants such as polyoxyethylene alkyl ethers, polyoxyethylene alkylaryl ethers, polyoxyethylene (propylene)fatty acid esters, sorbitan monooleate, and polyoxyethylene sorbitan monolaurate; and anionic surfactants such as sodium alkylarylsulfonates, sodium dialkylsuccinate sodium dialkylsulfosuccinates, polyoxyethylene alkylaryl ether sulfates, polyoxyethylene alkyl phosphates, polyoxyethylene alkylaryl phosphates, and sodium alkylnaphthalenesulfonates.

Particularly, a mixture of a surfactant of vegetable oil derivatives, a nonionic surfactant and an anionic surfactant is preferably used.

The suspension concentrate of the present invention is prepared, for example, according to the following procedure.

At least one compound selected from among the sulfonamide compounds represented by the aforementioned general formula (I) and their salts as an active ingredient compound(s) is uniformly mixed with a vegetable oil and a surfactant and the resulting mixture is ground in order to obtain a suspension concentrate. Alternatively, such an active ingredient compound(s) preliminarily ground is merely mixed with a vegetable oil and a surfactant to obtain a suspension concentrate.

When consideration is given to the suspension stability of the active ingredient compound(s) in the suspension concentrate, a thixotropic material(s) such as a bentonite-alkylamine complex(es) and/or aerosil may be added in an amount of, for example, 1 to 3 weight % based on the total concentrate if necessary.

The suitable blending weight ratio of the above-mentioned active ingredient compound(s), the vegetable oil and the surfactant, which are the main components composing the suspension concentrate of the present invention, is in the ranges of from 0.5 to 20:from 55 to 94.5:from 5 to 25 respectively, and preferably from 2 to 6:from 77 to 90:from 8 to 17 respectively.

The suitable amount of the suspension concentrate of the present invention to be used, cannot be generically specified because it varies depending on various conditions. In general, however, it is in the range of from 0.05 to 50 g/a, preferably from 0.1 to 25 g/a, and more preferably from 0.1 to 2.5 g/a, in terms of the amount of the active ingredient compound.

In order to illustrate the present invention in more detail, description will now be made of Formulation Examples wherein the herbicidal suspension concentrates of the present invention were prepared and Test Examples wherein some of the prepared suspension concentrates were used, both of which, however, should not be construed as limiting the scope of the present invention.

Preparation of Suspension Concentrates

FORMULATION EXAMPLE 1

| | |
|---|---|
| (1) N—[(4,6-dimethoxypyrimidin-2-yl)aminocarbonyl]-3-dimethylaminocarbonyl-2-pyridinesulfonamide | 5 parts by weight |
| (2) corn oil | 84 parts by weight |
| (3) Sorpol 3747 (trade name of a mixture of a polyoxyethylene alkylaryl ether, polyoxyethylene hydrogenated castor oil ether, a polyoxyethylene alkylaryl phosphate, a sodium dialkylsulfosuccinate, and a fatty acid manufactured by Toho Chemical Co., Ltd.) | 10 parts by weight |
| (4) bentonite-alkylamine complex | 1 part by weight |

The above-mentioned components (1) to (4) were mixed uniformly and the resulting mixture was ground with a Dyno-Mill (manufactured by Willy A. Bachofen AG) to obtain a suspension concentrate according to the present invention.

FORMULATION EXAMPLE 2

A suspension concentrate according to the present invention was prepared in substantially the same manner as in the above-mentioned Formulation Example 1 except that 82 parts by weight of corn oil was used instead of 84 parts by weight and 12 parts by weight of Sorpol 3815 (trade name of a mixture of a polyoxyethylene alkylaryl ether, polyoxyethylene hydrogenated castor oil ether, a fatty acid derivative, and a sodium dialkylsulfosuccinate manufactured by Toho Chemical Co., Ltd.) was used instead of 10 parts by weight of Sorpol 3747.

FORMULATION EXAMPLE 3

| | |
|---|---|
| (1) N—[(4,6-dimethoxypyrimidin-2-yl)aminocarbonyl]-3-dimethylaminocarbonyl-2-pyridinesulfonamide | 5.06 parts by weight |
| (2) corn oil, soybean oil, cotton seed oil, rape seed oil or linseed oil | 80.94 parts by weight |
| (3) Sorpol 3815 | 12 parts by weight |
| (4) bentonite-alkylamine complex | 2 parts by weight |

A suspension concentrate according to the present invention was prepared using the above-mentioned components (1) to (4) in substantially the same manner as in the above-mentioned Formulation Example 1.

FORMULATION EXAMPLE 4

| | |
|---|---|
| (1) N—[(4,6-dimethoxypyrimidin-2-yl)aminocarbonyl]-3-dimethylaminocarbonyl-2-pyridinesulfonamide | 2 parts by weight |
| (2) corn oil | 85 parts by weight |

-continued

| | |
|---|---|
| (3) Sorpol 3815 | 10 parts by weight |
| (4) bentonite-alkylamine complex | 3 parts by weight |

A suspension concentrate according to the present invention is prepared using the above-mentioned components (1) to (4) in substantially the same manner as in the above-mentioned Formulation Example 1.

FORMULATION EXAMPLE 5

| | |
|---|---|
| (1) N—[(4,6-dimethoxypyrimidin-2-yl)aminocarbonyl]-3-dimethylaminocarbonyl-2-pyridinesulfonamide | 6 parts by weight |
| (2) corn oil | 80 parts by weight |
| (3) Sorpol 3747 | 13 parts by weight |
| (4) bentonite-alkylamine complex | 1 part by weight |

A suspension concentrate according to the present invention is prepared using the above-mentioned components (1) to (4) in substantially the same manner as in the above-mentioned Formulation Example 1.

Plant Test Method and Results

TEST EXAMPLE 1

1/3,000 are (a) pots and 1/10,000 are (a) pots were filled with upland soil. Corn (*Zea mays*) (variety: Royal Dent 105 T) was sown in the 1/3,000 are (a) pots, while large crabgrass (*Digitaria adscendens*) and smartweed (*Polygonum hydropiper*) were separately sown in the 1/10,000 are (a) pots. When the plants reached respective given growth stages (a 4-leaf stage for corn, a 3-leaf stage for large crabgrass, and a 1-leaf stage for smartweed), 5 liters/a each of aqueous diluted suspensions, prepared by suspending in water the suspension concentrate prepared in the aforementioned Formulation Example 2 so as to provide respective amounts of the active ingredient of 1.25 g/a and 0.625 g/a, were each separately foliarly applied to the plants with a small spray gun.

The progress of growth of the plants was visually observed and examined 29 days after the application to evaluate the degree of growth control according to 10 ratings (1: the same as in an untreated plot to 10: perfect growth control). The results are shown in Table 1.

For comparison, a test was made using substantially the same procedure as in the above-mentioned Test Example 1 except that use was made of individual comparative suspensions prepared by suspending the following wettable powder in water so as to provide respective amounts of its active ingredient of 1.25 g/a and 0.625 g/a and admixing 0.2 weight % of Shin Rino (trade name of a mixture of a polyethylene glycolalkylphenol ether and a lignonsulfonate manufactured by Nihon Nohyaku Co., Ltd.) with the respective resulting aqueous diluted suspensions. The results are shown in Table 1.

TABLE 1

| | Degree of Growth Control | | | | | |
|---|---|---|---|---|---|---|
| | corn 4L | | large crabgrass 3L | | smartweed 1L | |
| | Amount of Active Ingredient (g/a) | | | | | |
| | 1.25 | 0.625 | 1.25 | 0.625 | 1.25 | 0.625 |
| Plots Using Present Invention | 1 | 1 | 10 | 9 | 10 | 10 |
| Plots Using Comparative Suspension | 1 | 1 | 9 | 6–7 | 10 | 10 |

(Note) The wettable powder used in the comparative plots is a mixture composed of 40 parts by weight of N—[(4,6-dimethoxypyrimidin-2-yl)aminocarbonyl]-3-dimethylaminocarbonyl-2-pyridinesulfonamide, 8 parts by weight of Carplex #80 (trade name of synthetic fine silica manufactured by Shionogi & Co., Ltd.), 46 parts by weight of jeaklite, 4 parts by weight of Sorpol 5039 (trade name of a polyoxyethylene alkylaryl ether sulfate manufactured by Toho Chemical Co., Ltd.), and 2 parts by weight of Dikssol W-92 (trade name of polyoxyethylene octylphenyl ether manufactured by Dai-ichi Kogyo Seiyaku Co., Ltd.).

TEST EXAMPLE 2

Corns (*Zea mays*) (varieties: Royal Dent 105T and Golden cross vantum) were sown in 6 test plots, each 2 $m^2$, and weeds were allowed to naturally grow therein. The growth stages of the plants 36 days after the sowing of corns were 4 to 6-leaf stages (a 5.2-leaf stage on the average) for Royal Dent 105T, 3 to 5.6-leaf stages (a 4.2-leaf stage on the average) for Golden cross vantum, 1 to 7-leaf stages (a 4.5-leaf stage on the average) for green foxtail (*Setaria viridis*), 1 to 6-leaf stages (a 4-leaf stage on the average) for large crabgrass (*Digitaria adscendens*), 2 to 6.5-leaf stages (a 4-leaf stage on the average) for smartweed (*Polyonum hydropiper*), cotyledon to 4-leaf stages (a 2-leaf stage on the average) for pigweed (*Amaranthus retroflexus*), and cotyledon to 4.2-leaf stages (a 3-leaf stage on the average) for cocklebur (*Xanthium strumarium*). Thirty six days after the sowing of corns, 8 liters/a each of aqueous diluted suspensions prepared by suspending in water the suspension concentrate prepared in the aforementioned Formulation Example 3 (corn oil was used as a vegetable oil) so as to provide respective amounts of the active ingredient of 1.25 g/a and 0.75 g/a were foliarly applied to the plants with a manual knap-sack type sprayer. The foregoing test was repeated.

The progress of growth of the plants was visually observed and examined 45 days after the application evaluate the degree of growth control according to the same ratings as in the aforementioned Test Example 1.

The average ratings for the degree of growth control evaluated for the two test runs were found to be 1 for both of the two varieties of corns as crops and 10 for all of green foxtail, large crabgrass, smartweed, pigweed, and cocklebur.

TEST EXAMPLE 3

1/3,000 are (a) pots were filled with upland soil. Corn (*Zea mays*) (variety: Royal Dent 105 T) and large crabgrass (*Digitaria adscendens*) were sown in the separate pots respectively, and grown under upland condition in a greenhouse. When the plants reached respective given growth stages (a 4.8-leaf stage for corn and a 3.5-leaf stage for large crabgrass), 5 liters/a each of aqueous diluted suspensions, prepared by suspending in water the suspension concentrate prepared in the aforementioned Formulation Example 3, were each separately foliarly applied to the plants with a small spray gun.

The progress of growth of the plants was visually observed and examined 28 days after the application to evaluate the degree of growth control according to the same ratings as in the aforementioned Test Example 1. The results are shown in Table 2.

For comparison, a test was made according to substantially the same procedure as in the abovementioned Test Example 3 using the same wettable powder applied for the comparative plots in the aforementioned Test Example 1.

TABLE 2

| | Degree of Growth Control | | | | | |
|---|---|---|---|---|---|---|
| | corn 4.8L | | | large crabgrass 3.5L | | |
| | Amount of Active Ingredient (g/a) | | | | | |
| Vegetable Oil Used | 1 | 0.5 | 0.25 | 1 | 0.5 | 0.25 |
| Corn Oil | | | | | | |
| Plots Using Present Invention | 1 | 1 | 1 | 9–10 | 9 | 6 |
| Soybean Oil | | | | | | |
| Plots Using Present Invention | 1 | 1 | 1 | 10 | 9–10 | 6 |
| Cotton Seed Oil | | | | | | |
| Plots Using Present Invention | 1 | 1 | 1 | 9–10 | 9 | 7 |
| Rape Seed Oil | | | | | | |
| Plots Using Present Invention | 1 | 1 | 1 | 9–10 | 9 | 7–8 |
| Linseed Oil | | | | | | |
| Plots Using Present Invention | 1 | 1 | 1 | 10 | 9 | 6 |
| None | | | | | | |
| Plots Using Compara- | 1 | 1 | 1 | 4 | 3 | 2 |

TABLE 2-continued

| | Degree of Growth Control | | | | | |
|---|---|---|---|---|---|---|
| | corn 4.8L | | | large crabgrass 3.5L | | |
| | Amount of Active Ingredient (g/a) | | | | | |
| Vegetable Oil Used | 1 | 0.5 | 0.25 | 1 | 0.5 | 0.25 |
| tive Suspension | | | | | | |

What is claimed is:

1. A herbicidal suspension concentrate characterized by comprising from 0.5 to 20 parts by weight of at least one compound selected from among sulfonamide compounds represented by the general formula (I):

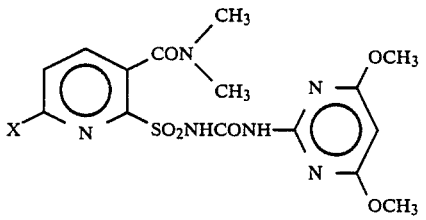

(I)

wherein X is a hydrogen atom, a chlorine atom, a bromine atom, a methyl group, or a difluoromethyl group and their salts as an active ingredient; from 55 to 94.5 parts by weight of a vegetable oil, and from 5 to 25 parts by weight of a surfactant.

2. A herbicidal suspension concentrate as claimed in claim 1, wherein the vegetable oil is at least one selected from the group consisting of olive oil, kapok oil, castor oil, palm oil, camellia oil, coconut oil, sesame oil, corn oil, rice bran oil, peanut oil, cotton seed oil, soybean oil, rape seed oil, linseed oil and tung oil.

3. A herbicidal suspension concentrate as claimed in claim 1, wherein the weight ratio of the sulfonamide compound represented by the general formula (I) or its salt, the vegetable oil and the surfactant is in the ranges of from 2 to 6:from 77 to 90:from 8 to 17, respectively.

4. A herbicidal suspension concentrate as claimed in claim 1, wherein the suspension concentrate comprises from 0.5 to 20 parts by weight of N-[(4,6-dimethoxypyrimidin-2-yl)aminocarbonyl]-3-dimethylaminocarbonyl-2-pyridinesulfonamide or its salt, from 55 to 94.5 parts by weight of corn oil, and from 5 to 25 parts by weight of a mixture of surfactants.

* * * * *